(12) United States Patent
Hayashi et al.

(10) Patent No.: US 12,190,477 B2
(45) Date of Patent: Jan. 7, 2025

(54) IMAGE PROCESSING SYSTEM, IMAGE PROCESSING DEVICE, IMAGE PROCESSING METHOD, AND IMAGE PROCESSING PROGRAM

(71) Applicant: FUJIFILM Corporation, Tokyo (JP)

(72) Inventors: Kenkichi Hayashi, Saitama (JP); Yosuke Naruse, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/550,800

(22) Filed: Aug. 26, 2019

(65) Prior Publication Data

US 2019/0378259 A1 Dec. 12, 2019

Related U.S. Application Data

(63) Continuation of application No. PCT/JP2017/046519, filed on Dec. 26, 2017.

(30) Foreign Application Priority Data

Mar. 10, 2017 (JP) .................................. 2017-046594

(51) Int. Cl.
*G06T 5/50* (2006.01)
*G01B 11/02* (2006.01)
(Continued)

(52) U.S. Cl.
CPC .............. *G06T 5/50* (2013.01); *G01B 11/022* (2013.01); *G01N 21/8851* (2013.01); *G06T 5/00* (2013.01); *G06T 7/97* (2017.01)

(58) Field of Classification Search
CPC .. G06T 5/50; G06T 7/97; G06T 5/001; G06T 2207/30168; G06T 7/0002; G06T 5/006;
(Continued)

(56) References Cited

U.S. PATENT DOCUMENTS 5,537,669 A * 7/1996 Evans ................... G06T 7/0004
382/280
5,717,780 A 2/1998 Mitsumune et al.
(Continued)

FOREIGN PATENT DOCUMENTS

CN 102472622 A 5/2012
JP 7-27714 A 1/1995
(Continued)

OTHER PUBLICATIONS

International Preliminary Report on Patentability (form PCT/IPEA/409), with a completion date Oct. 23, 2018, for corresponding International Application No. PCT/JP2017/046519, with an English translation.
(Continued)

*Primary Examiner* — Kathleen Y Dulaney
(74) *Attorney, Agent, or Firm* — Birch, Stewart, Kolasch & Birch, LLP

(57) ABSTRACT

Provided are an image-processing system, an image-processing device, an image-processing method, and an image-processing program capable of appropriately inspecting, measuring, or recognizing targets by using a plurality of imaging units even in a case where there is an individual difference in performance of each imaging unit. An image correction-processing unit that individually acquires pieces of image data from a first camera and a second camera to individually correct image deterioration caused by each of the cameras by pieces of image-processing and an inspection processing unit that individually acquires the pieces of image data after the correction from the image correction-processing unit to individually inspect imaged targets by pieces of image-processing are provided. In a case where the first camera and the second camera image the same targets, the image correction-processing unit individually corrects
(Continued)

the image data acquired from each camera such that inspection results match within a desired range.

17 Claims, 8 Drawing Sheets

(51) Int. Cl.
  *G01N 21/88* (2006.01)
  *G06T 5/00* (2024.01)
  *G06T 7/00* (2017.01)
(58) Field of Classification Search
  CPC .. G01B 11/022; G01B 21/045; G01B 11/245; G01N 21/8851; G01N 2021/8887; H04N 5/225; H04N 5/232
  USPC .................................. 382/254, 145; 348/126
  See application file for complete search history.

(56) References Cited

U.S. PATENT DOCUMENTS

| | | | | |
|---|---|---|---|---|
| 5,825,483 A * | 10/1998 | Michael | .................. | G03F 7/706 356/243.1 |
| 6,151,406 A * | 11/2000 | Chang | ...................... | G06T 7/33 382/151 |
| 6,323,776 B1 * | 11/2001 | Jackson | ............... | G05B 19/401 382/172 |
| 6,633,375 B1 * | 10/2003 | Veith | .................. | G01N 21/9501 382/145 |
| 6,806,903 B1 * | 10/2004 | Okisu | .................... | H04N 25/61 348/E5.079 |
| 7,564,626 B2 * | 7/2009 | Bendall | .................... | A61B 1/05 600/101 |
| 7,664,608 B2 * | 2/2010 | Urano | ................ | G01N 21/9501 702/33 |
| 8,593,546 B2 * | 11/2013 | Kanemitsu | ............. | H04N 25/60 348/246 |
| 8,655,068 B1 * | 2/2014 | Li | ........................... | H04N 1/60 382/128 |
| 8,885,040 B2 * | 11/2014 | Puah | .................... | H04N 13/243 250/559.34 |
| 2001/0024280 A1 * | 9/2001 | Fukuda | ................ | G01B 11/245 356/609 |
| 2002/0034324 A1 * | 3/2002 | Beaty | ........................ | G06T 7/70 382/145 |
| 2002/0037098 A1 * | 3/2002 | Beaty | ..................... | G06T 7/0002 382/145 |
| 2004/0012775 A1 * | 1/2004 | Kinney | ............... | G01N 21/9501 356/237.2 |
| 2004/0146295 A1 * | 7/2004 | Furman | ............ | G01N 21/95607 398/9 |
| 2004/0233280 A1 * | 11/2004 | Aoyama | ................... | G06T 7/85 348/E7.086 |
| 2007/0104353 A1 * | 5/2007 | Vogel | ....................... | G01C 1/04 382/106 |
| 2007/0183646 A1 * | 8/2007 | Beaty | .................... | G06T 7/0004 382/145 |
| 2009/0136117 A1 * | 5/2009 | Barkol | .................... | G01N 21/94 382/145 |
| 2010/0172567 A1 * | 7/2010 | Prokoski | ................ | A61B 5/418 348/47 |
| 2010/0309304 A1 * | 12/2010 | Chalmond | .............. | G06T 7/571 382/154 |
| 2011/0149275 A1 * | 6/2011 | Nakano | ............ | G01N 21/95607 356/237.2 |
| 2012/0148109 A1 * | 6/2012 | Kawamura | ............... | G02B 7/38 382/106 |
| 2013/0294678 A1 * | 11/2013 | Blonigan | .......... | H01L 21/67754 382/145 |
| 2014/0052555 A1 * | 2/2014 | MacIntosh | ............... | G07G 1/12 705/23 |
| 2014/0184786 A1 * | 7/2014 | Georgeson | ............ | G01M 99/00 348/128 |
| 2014/0225990 A1 * | 8/2014 | Einecke | ............... | H04N 13/128 382/104 |
| 2015/0103147 A1 * | 4/2015 | Ho | ............................ | G06T 7/85 348/47 |
| 2015/0210278 A1 * | 7/2015 | Ben Shalom | .......... | B60K 31/00 382/104 |
| 2015/0262346 A1 * | 9/2015 | Horita | ....................... | G06T 7/74 348/137 |
| 2015/0269723 A1 * | 9/2015 | Karam | .................... | G06V 20/64 348/46 |
| 2015/0278610 A1 * | 10/2015 | Renner | .................. | G06K 9/209 340/435 |
| 2016/0044257 A1 * | 2/2016 | Venkataraman | ..... | H04N 25/581 348/239 |
| 2017/0076481 A1 * | 3/2017 | Koga | ................. | G02B 21/0032 |
| 2017/0122890 A1 * | 5/2017 | Inoue | ................. | G01N 23/2251 |
| 2017/0186146 A1 * | 6/2017 | Raniwala | ............... | H04N 13/25 |
| 2017/0374331 A1 * | 12/2017 | Liu | ........................ | G03B 21/53 |
| 2018/0089524 A1 * | 3/2018 | Takahashi | ............ | G06V 10/255 |
| 2018/0101944 A1 * | 4/2018 | Sakai | ................... | H01L 22/12 |
| 2018/0159469 A1 * | 6/2018 | Trupke | ................... | H02S 50/15 |
| 2019/0102868 A1 * | 4/2019 | Beric | ....................... | G06T 3/047 |

FOREIGN PATENT DOCUMENTS

| | | |
|---|---|---|
| JP | 8-5316 A | 1/1996 |
| JP | 11-337493 A | 12/1999 |
| JP | 2001-153625 A | 6/2001 |
| JP | 2008-281348 A | 11/2008 |
| JP | 2009-284188 A | 12/2009 |
| JP | 2013-211707 A | 10/2013 |
| JP | 2014-35261 A | 2/2014 |
| JP | 2014-107631 A | 6/2014 |
| JP | 2014-123797 A | 7/2014 |
| JP | 2015-197780 A | 11/2015 |
| WO | WO-2015200184 A1 * | 12/2015 ......... G01N 21/8806 |

OTHER PUBLICATIONS

International Search Report (form PCT/ISA/210), dated Mar. 27, 2018, for corresponding International Application No. PCT/JP2017/046519, with an English translation.
Written Opinion of the International Searching Authority (form PCT/ISA/237), dated Mar. 27, 2018, for corresponding International Application No. PCT/JP2017/046519.
Chinese Ofice Action and Search Report, dated Jul. 24, 2020, for corresponding Chinese Application No. 201780088006.0, with an English translation of the Chinese Office Action.

* cited by examiner

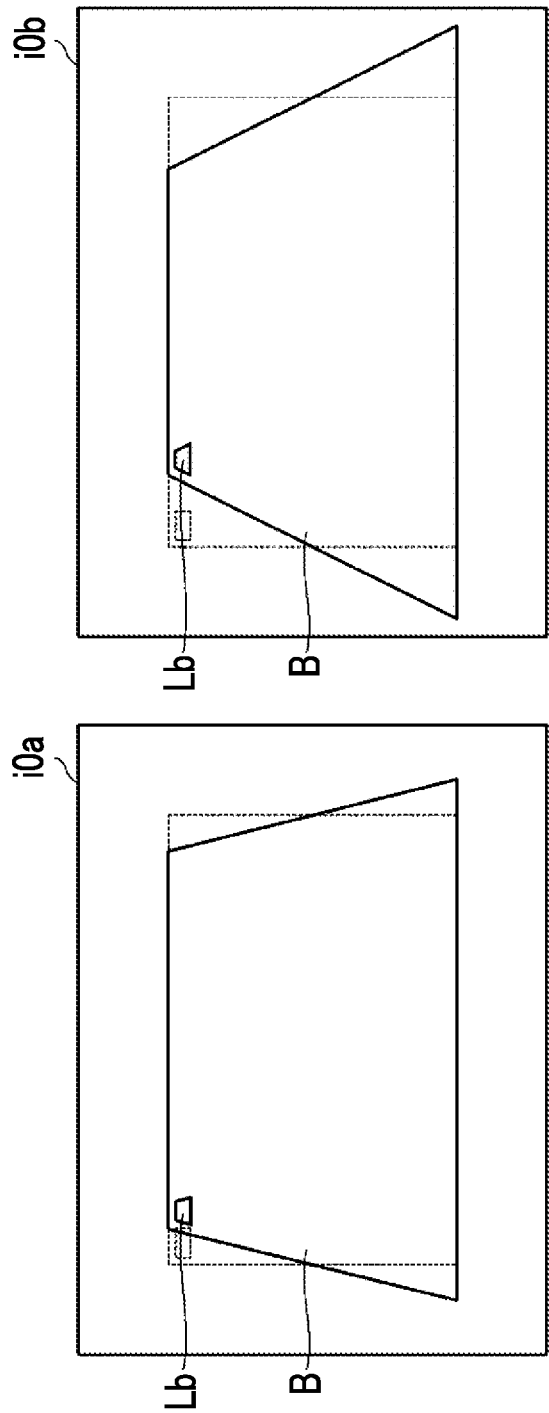

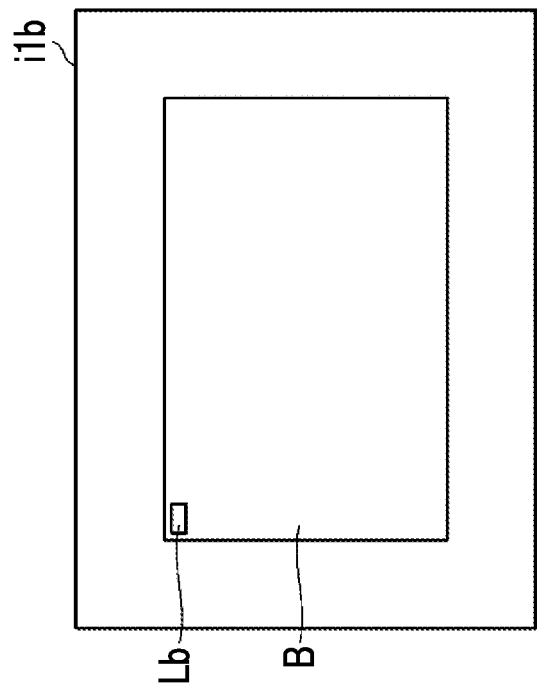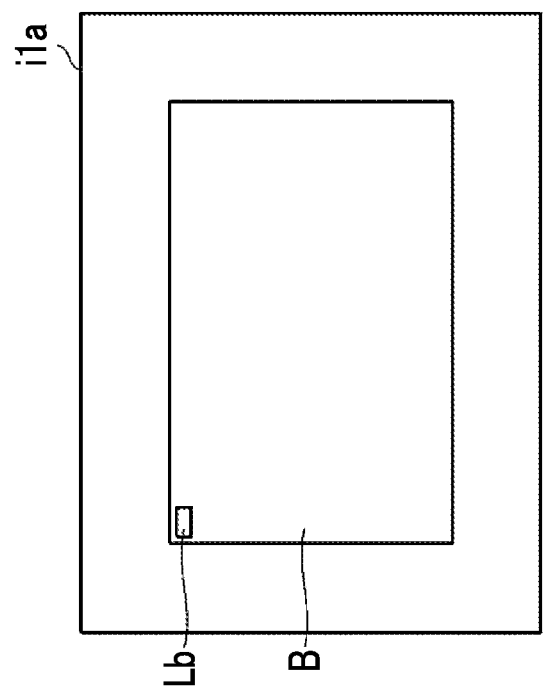

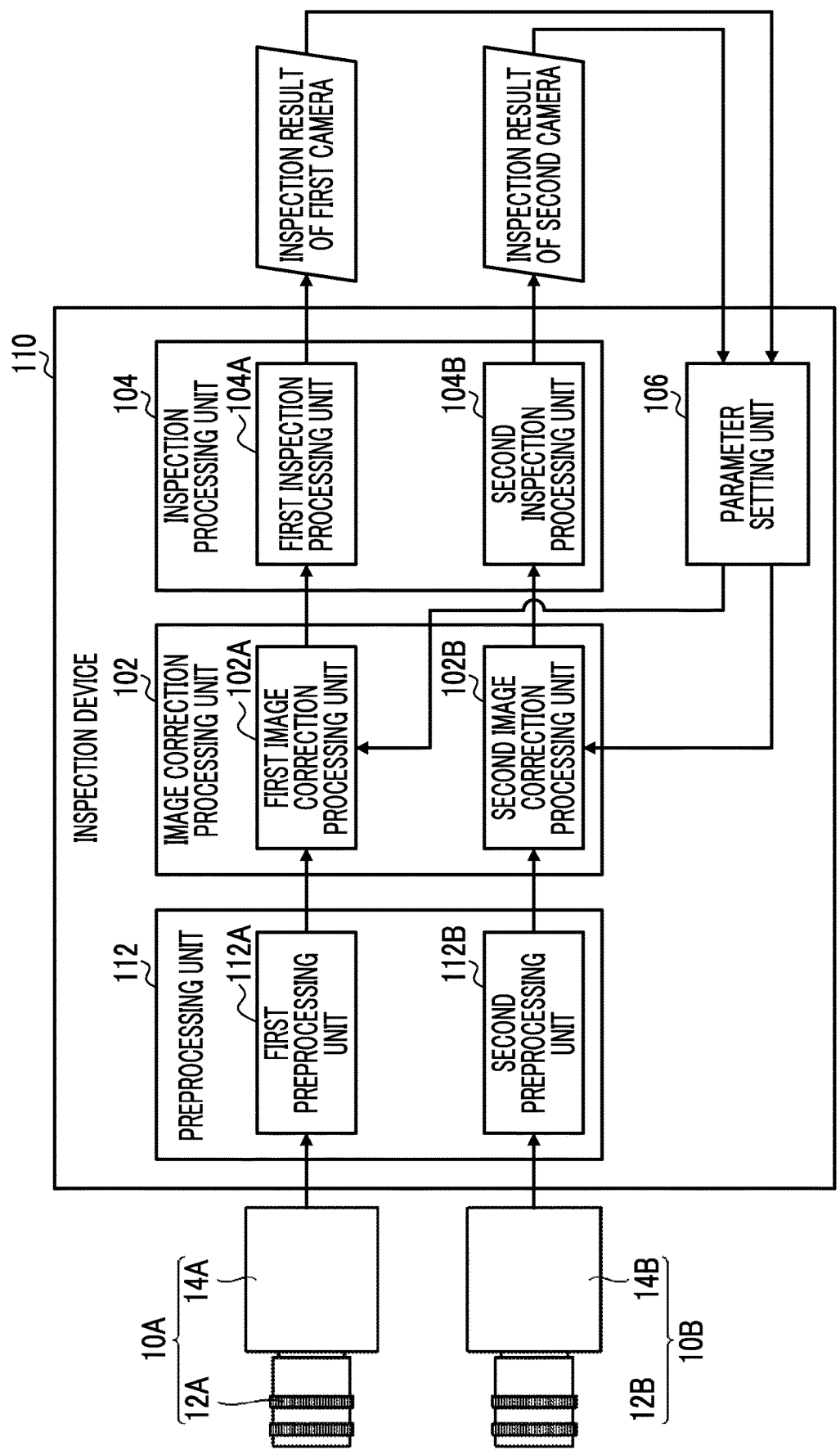

IMAGE PROCESSING SYSTEM, IMAGE PROCESSING DEVICE, IMAGE PROCESSING METHOD, AND IMAGE PROCESSING PROGRAM

CROSS-REFERENCE TO RELATED APPLICATIONS

This application is a Continuation of PCT International Application No. PCT/JP2017/046519 filed on Dec. 26, 2017, which claims priority under 35 U.S.C § 119(a) to Japanese Patent Application No. 2017-046594 filed on Mar. 10, 2017. Each of the above application(s) is hereby expressly incorporated by reference, in its entirety, into the present application.

BACKGROUND OF THE INVENTION

1. Field of the Invention

The invention relates to an image processing system, an image processing device, an image processing method, and a non-transitory computer readable recording medium storing an image processing program that acquire pieces of image data from a plurality of imaging units to inspect, measure, or recognize a target imaged by each imaging unit by image processing.

2. Description of the Related Art

There is a known technique of acquiring pieces of image data from a plurality of imaging units to inspect, measure, or recognize a target imaged by each imaging unit by image processing is known.

For example, JP2001-153625A, JP1995-027714A (JP-H07-027714A), and the like disclose a technique of imaging an inspection target by a plurality of imaging units and performing image processing of image data obtained from each imaging unit to inspect quality of appearance, presence of damage, and the like.

JP2008-281348A discloses a technique of imaging measurement targets by a plurality of imaging units and performing image processing of image data obtained from each imaging unit to measure a position, a size, and the like.

JP1996-005316A (JP-H08-005316A), JP2015-197780A, and the like disclose a technique of performing image processing of pieces of image data obtained by imaging a target by a plurality of imaging units to recognize a character or the like written on the imaged targets.

SUMMARY OF THE INVENTION

However, in a case where an inspection or the like is performed by using a plurality of imaging units, there is a variation in quality of image data obtained from each imaging unit in a case where performance of each imaging unit is not uniform. For example, in a case where there is an individual difference in an imaging lens used by each of the imaging units, there is a variation in quality of image data obtained from each imaging unit. In a case where there is the variation in the quality of the image data obtained from each imaging unit, a result of the inspection or the like in a subsequent stage is affected by the variation.

Since cameras constituting the imaging unit usually have the individual difference, it is difficult to prepare a plurality of imaging units having exactly the same performance. In particular, it is difficult to prepare a plurality of imaging lenses having exactly the same performance.

It is possible to uniformize the performance by individually adjusting each imaging unit, but there is a problem that it takes a lot of time and effort for the adjustment. In particular, in a case where the imaging lenses having the individual difference are used, it takes a lot of time and effort for the adjustment.

It is also possible to individually adjust a determination criterion or the like of the inspection or the like in the subsequent stage, but there is also a problem that it takes a lot of time and effort for the adjustment. In particular, in a case where there is a large number of parameters, it is not practical to adjust each one by one. In a case where machine learning or the like is used for the processing such as the inspection in a subsequent stage, an unpredictable adverse influence may appear in a case of adjusting a parameter. In a case where machine learning using a neural network or the like is used for the processing such as the inspection in the subsequent stage, it takes a lot of effort for performing the learning again for each individual difference of the imaging unit.

The invention is made in consideration of such circumstances, and an object of the invention is to provide an image processing system, an image processing device, an image processing method, and a non-transitory computer readable recording medium storing an image processing program capable of appropriately inspecting, measuring, or recognizing targets by using a plurality of imaging units even in a case where there is an individual difference in performance of each imaging unit.

Means for solving the above problems is as follows.

(1) An image processing system comprising: a plurality of imaging units; a first image processing unit that individually acquires pieces of image data from the plurality of imaging units to individually correct image deterioration caused by each of the imaging units by pieces of image processing; and a second image processing unit that individually acquires the pieces of image data after the correction from the first image processing unit to individually inspect, measure, or recognize imaged targets by pieces of image processing, in which in a case where the plurality of imaging units individually image a plurality of substantially the same targets that have same shapes and/or same appearances, the first image processing unit individually corrects the pieces of image data acquired from the plurality of imaging units such that results of the second image processing unit match within a desired range.

According to the aspect, the first image processing unit and the second image processing unit are provided as the image processing unit. The first image processing unit individually acquires the pieces of image data from the plurality of imaging units to individually correct the image deterioration caused by each of the imaging units, for example, image deterioration caused by an optical system provided in each of the imaging units by pieces of image processing. The second image processing unit individually acquires the pieces of image data after the correction from the first image processing unit to individually inspect, measure, or recognize the imaged targets by pieces of image processing. The first image processing unit does not simply correct the image deterioration caused by each of the imaging units but performs the correction in consideration of the inspection or the like in a subsequent stage. That is, the correction is performed such that the results of the inspection or the like match within a desired range in the case where the plurality of imaging units image the same targets instead of completely eliminating the image deterioration. Accordingly, it is possible to inspect or the like the targets with high accuracy by using the plurality of imaging units even in a case where there is an individual difference in performance of each imaging unit. Further, since the image processing performed for the inspection or the like does not need to be changed, it is possible to use the image processing even in a case where algorithm of an inspection or the like is unknown (so-called black box). Furthermore, since the image deterioration caused by the imaging unit can be directly operated, it is possible to adjust the image deterioration with a high degree of freedom.

The "same targets" include targets within a range that can be regarded as substantially the same. That is, the "same" herein includes a concept of substantially the same. For example, in a case where targets (for example, a plurality of screws or the like) that have the same shape and appearance but differ from each other are imaged, the case is also included in that the same targets are imaged.

The "match within a desired range" means that the results of the inspection or the like match at a level of accuracy required for the inspection or the like. Therefore, it is desirable that the correction is performed such that the results of the inspection or the like match, where an error is allowed within a constant range. That is, the correction may be performed such that the results of the inspection or the like substantially match.

Examples of the correction performed by the first image processing unit are a correction of image deformation, a correction of resolution, a correction of image magnification, and a correction of spectral transmittance and the like.

(2) The image processing system according to (1), further comprising: a third image processing unit that individually acquires the pieces of image data from the plurality of imaging units to individually correct and uniformize a variation in image quality occurring due to a difference in an imaging environment by pieces of image processing, in which the first image processing unit individually acquires the pieces of image data after the correction from the third image processing unit to individually correct image deterioration caused by each of the imaging units by pieces of image processing.

According to the aspect, the third image processing unit is further provided. The third image processing unit individually acquires the pieces of image data from the plurality of imaging units to individually correct and uniformize the variation in the image quality occurring due to the difference in the imaging environment by the pieces of image processing. The first image processing unit individually acquires the pieces of image data after the correction from the third image processing unit to individually correct the image deterioration caused by each of the imaging units by the pieces of image processing. Accordingly, it is possible to correct the variation in the image quality occurring due to the difference in the imaging environment.

Examples of the correction by the third image processing unit are a correction of brightness and a correction of white balance and the like.

(3) The image processing system according to (1) or (2), in which the first image processing unit individually corrects image deterioration caused by an optical system provided in each of the imaging units by pieces of image processing.

According to the aspect, the image deterioration caused by the optical system provided in each of the imaging units is individually corrected by the pieces of image processing in the first image processing unit. For example, distortion occurring due to the optical system, degradation of resolution, and the like are corrected by the pieces of image processing. Accordingly, it is possible to appropriately inspect or the like the targets even in a case where imaging lenses having an individual difference are used.

(4) The image processing system according to any one of (1) to (3), further comprising: a parameter setting unit that sets a parameter of the image processing performed by the first image processing unit, in which the parameter setting unit sets the parameter based on the results of the inspection, the measurement, or the recognition by the second image processing unit.

According to the aspect, the parameter setting unit that sets the parameter of the image processing performed by the first image processing unit is further provided. The parameter setting unit sets the parameter based on the results of the inspection or the like by the second image processing unit. That is, the parameter of the image processing performed by the first image processing unit is set such that the results of the inspection or the like match within a desired range in the case where the plurality of imaging units image the same targets.

(5) The image processing system according to (4), in which the parameter setting unit optimizes a parameter based on a change in the results of the second image processing unit in a case where the parameter is changed.

According to the aspect, the parameter is optimized by observing the change in the results of the inspection or the like of the second image processing unit in the case where the parameter is changed. For example, change states of the results of the inspection or the like of the second image processing unit are measured while the parameter is minutely changed to optimize the parameter based on the measurement result.

(6) The image processing system according to (4), in which the parameter setting unit optimizes the parameter by a gradient method.

According to the aspect, the gradient method is employed as a method of optimizing the parameter.

(7) An image processing device comprising: a first image processing unit that individually acquires pieces of image data from a plurality of imaging units to individually correct image deterioration caused by each of the imaging units by pieces of image processing; and a second image processing unit that individually acquires the pieces of image data after the correction from the first image processing unit to individually inspect, measure, or recognize imaged targets by pieces of image processing, in which in a case where the plurality of imaging units individually image a plurality of substantially the same targets that have same shapes and/or same appearances, the first image processing unit individually corrects the pieces of image data acquired from the plurality of imaging units such that results of the second image processing unit match within a desired range.

According to the aspect, the first image processing unit and the second image processing unit are provided as the image processing unit. The first image processing unit individually acquires the pieces of image data from the plurality of imaging units to individually correct the image deterioration caused by each of the imaging units by the pieces of image processing. The second image processing unit individually acquires the pieces of image data after the correction from the first image processing unit to individually inspect, measure, or recognize the imaged targets by the pieces of image processing. The first image processing unit does not simply correct the image deterioration caused by each of the imaging units but performs the correction in consideration of the inspection or the like in a subsequent stage. That is, the correction is performed such that the results of the inspection or the like match within a desired range in the case where the plurality of imaging units image the same targets instead of completely eliminating the image deterioration. Accordingly, it is possible to inspect or the like the targets with high accuracy by using the plurality of imaging units even in a case where there is an individual difference in performance of each imaging unit. Further, since the image processing performed for the inspection or the like does not need to be changed, it is possible to use the image processing even in a case where algorithm of an inspection or the like is unknown (so-called black box). Furthermore, since the image deterioration caused by the imaging unit can be directly operated, it is possible to adjust the image deterioration with a high degree of freedom.

(8) The image processing device according to (7), further comprising: a third image processing unit that individually acquires the pieces of image data from the plurality of imaging units to individually correct and uniformize a variation in image quality occurring due to a difference in an imaging environment by pieces of image processing, in which the first image processing unit individually acquires the pieces of image data after the correction from the third image processing unit to individually correct image deterioration caused by each of the imaging units by pieces of image processing.

According to the aspect, the third image processing unit is further provided. The third image processing unit individually acquires the pieces of image data from the plurality of imaging units to individually correct and uniformize the variation in the image quality occurring due to the difference in the imaging environment by the pieces of image processing. The first image processing unit individually acquires the pieces of image data after the correction from the third image processing unit to individually correct the image deterioration caused by each of the imaging units by the pieces of image processing. Accordingly, it is possible to correct the variation in the image quality occurring due to the difference in the imaging environment.

(9) The image processing device according to (7) or (8), in which the first image processing unit individually corrects image deterioration caused by an optical system provided in each of the imaging units by pieces of image processing.

According to the aspect, the image deterioration caused by the optical system provided in each of the imaging units is corrected by the pieces of image processing in the first image processing unit.

(10) The image processing device according to any one of (7) to (9), further comprising: a parameter setting unit that sets a parameter of the image processing performed by the first image processing unit, in which the parameter setting unit sets the parameter based on the results of the inspection, the measurement, or the recognition by the second image processing unit.

According to the aspect, the parameter setting unit that sets the parameter of the image processing performed by the first image processing unit is further provided. The parameter setting unit sets the parameter based on the results of the inspection or the like by the second image processing unit. That is, the parameter of the image processing performed by the first image processing unit is set such that the results of the inspection or the like match within a desired range in the case where the plurality of imaging units image the same targets.

(11) An image processing method comprising: a first image processing step of individually acquiring pieces of image data from a plurality of imaging units to individually correct image deterioration caused by each of the imaging units by pieces of image processing; and a second image processing step of individually acquiring the pieces of image data after the correction in the first image processing step to individually inspect, measure, or recognize imaged targets by pieces of image processing, in which in a case where the plurality of imaging units individually image a plurality of substantially the same targets that have same shapes and/or same appearances, the first image processing step individually corrects the pieces of image data acquired from the plurality of imaging units such that results of the inspection, the measurement, or the recognition in the second image processing step match within a desired range.

According to the aspect, the first image processing step and the second image processing step are provided as the image processing step of performing the pieces of image processing of the pieces of image data acquired from the plurality of imaging units to inspect or the like the imaged targets. The first image processing step individually acquires the pieces of image data from the plurality of imaging units to individually correct the image deterioration caused by each of the imaging units by the pieces of image processing. The second image processing step individually acquires the pieces of image data after the correction by the first image processing step to individually inspect, measure, or recognize the imaged targets by the pieces of image processing. The first image processing step does not simply correct the image deterioration caused by each of the imaging units but performs the correction in consideration of the inspection or the like in a subsequent stage. That is, the correction is performed such that the results of the inspection or the like match within a desired range in the case where the plurality of imaging units image the same targets instead of completely eliminating the image deterioration. Accordingly, it is possible to inspect or the like the targets with high accuracy by using the plurality of imaging units even in a case where there is an individual difference in performance of each imaging unit. Further, since the image processing performed for the inspection or the like does not need to be changed, it is possible to use the image processing even in a case where algorithm of an inspection or the like is unknown (so-called black box). Furthermore, since the image deterioration caused by the imaging unit can be directly operated, it is possible to adjust the image deterioration with a high degree of freedom.

(12) The image processing method according to (11), further comprising: a third image processing step of individually acquiring the pieces of image data from the plurality of imaging units to individually correct and uniformize a variation in image quality occurring due to a difference in an imaging environment by pieces of image processing, in which the first image processing step is executed after the third image processing step.

According to the aspect, the third image processing step is further included. The third image processing step individually acquires the pieces of image data from the plurality of imaging units to individually correct and uniformize the variation in the image quality occurring due to the difference in the imaging environment by the pieces of image processing. The first image processing step is implemented after the third image processing step. Accordingly, it is possible to correct the variation in the image quality occurring due to the difference in the imaging environment.

(13) The image processing method according to (11) or (12), further comprising: a parameter setting step of setting a parameter of the image processing performed by the first image processing step, in which in the parameter setting step, the parameter is set based on the results of the inspection, the measurement, or the recognition in the second image processing step.

According to the aspect, the parameter setting step of setting the parameter of the image processing performed by the first image processing step is further included. The parameter is set based on the results of the inspection or the like. That is, the parameter is set based on the results of the inspection or the like such that the results of the inspection or the like match within a desired range in the case where the plurality of imaging units image the same targets.

(14) The image processing method according to any one of (11) to (13), in which in the first image processing step, image deterioration caused by an optical system provided in each of the imaging units is individually corrected by pieces of image processing.

According to the aspect, the image deterioration caused by the optical system provided in each of the imaging units is corrected by the pieces of image processing in the first image processing unit.

(15) A non-transitory computer readable recording medium storing an image processing program causing a computer to realize: a first image processing function of individually acquiring pieces of image data from a plurality of imaging units to individually correct image deterioration caused by each of the imaging units by pieces of image processing; and a second image processing function of individually acquiring the pieces of image data after the correction by the first image processing function to individually inspect, measure, or recognize imaged targets by pieces of image processing, in which in the case where the plurality of imaging units individually image a plurality of substantially the same targets that have same shapes and/or same appearances, the first image processing function individually corrects the pieces of image data acquired from the plurality of imaging units such that results of the inspection, the measurement, or the recognition by the second image processing function match within a desired range.

According to the aspect, the first image processing function and the second image processing function are provided as the image processing function. The first image processing function individually acquires the pieces of image data from the plurality of imaging units to individually correct the image deterioration caused by each of the imaging units by the pieces of image processing. The second image processing function individually acquires the pieces of image data after the correction from the first image processing function to individually inspect, measure, or recognize the imaged targets by the pieces of image processing. The first image processing function does not simply correct the image deterioration caused by each of the imaging units but performs the correction in consideration of the inspection or the like in a subsequent stage. That is, the correction is performed such that the results of the inspection or the like match within a desired range in the case where the plurality of imaging units image the same targets instead of completely eliminating the image deterioration. Accordingly, it is possible to inspect or the like the targets with high accuracy by using the plurality of imaging units even in a case where there is an individual difference in performance of each imaging unit. Further, since the image processing performed for the inspection or the like does not need to be changed, it is possible to use the image processing even in a case where algorithm of an inspection or the like is unknown (so-called black box). Furthermore, since the image deterioration caused by the imaging unit can be directly operated, it is possible to adjust the image deterioration with a high degree of freedom.

(16) The non-transitory computer readable recording medium storing the image processing program according to (15), further comprising: a third image processing function of individually acquiring the pieces of image data from the plurality of imaging units to individually correct and uniformize a variation in image quality occurring due to a difference in an imaging environment by pieces of image processing, in which the first image processing function individually acquires the pieces of image data after the correction from the third image processing function to individually correct image deterioration caused by each of the imaging units by pieces of image processing.

According to the aspect, the third image processing function is further provided. The third image processing function individually acquires the pieces of image data from the plurality of imaging units to individually correct and uniformize the variation in the image quality occurring due to the difference in the imaging environment by the pieces of image processing. The first image processing function individually acquires the pieces of image data after the correction from the third image processing function to individually correct the image deterioration caused by each of the imaging units by the pieces of image processing. Accordingly, it is possible to correct the variation in the image quality occurring due to the difference in the imaging environment.

(17) The non-transitory computer readable recording medium storing the image processing program according to (15) or (16), further comprising: a parameter setting function of setting a parameter of the image processing performed by the first image processing function, in which the parameter setting function sets the parameter based on the results of the inspection, the measurement, or the recognition by the second image processing function.

According to the aspect, the parameter setting function of setting a parameter of the image processing performed by the first image processing function is further provided. The parameter setting function sets the parameter based on the results of the inspection or the like by the second image processing function. That is, the parameter of the image processing performed by the first image processing function is set such that the results of the inspection or the like match within a desired range in the case where the plurality of imaging units image the same targets.

(18) The non-transitory computer readable recording medium storing the image processing program according to any one of (15) to (17), in which the first image processing function individually corrects image deterioration caused by an optical system provided in each of the imaging units by pieces of image processing.

According to the aspect, the image deterioration caused by the optical system provided in each of the imaging units is corrected by the pieces of image processing in the first image processing function.

According to the invention, it is possible to appropriately inspect, measure, or recognize the targets by using the plurality of imaging units even in the case where there is the individual difference in the performance of each imaging unit.

BRIEF DESCRIPTION OF THE DRAWINGS

FIGS. 4A and 4B are views showing examples of pieces of original image data to be acquired from a first camera and a second camera in a case where the same targets are imaged.

FIGS. 5A and 5B are views showing examples of pieces of image data after a trapezoidal deformation correction.

FIG. 7 is a block diagram of functions provided in an inspection device according to a second embodiment.

DESCRIPTION OF THE PREFERRED EMBODIMENTS

Hereinafter, preferred embodiments for implementing the invention will be described in detail with reference to accompanying drawings.

First Embodiment

[Configuration of Inspection System]

Figure 1:
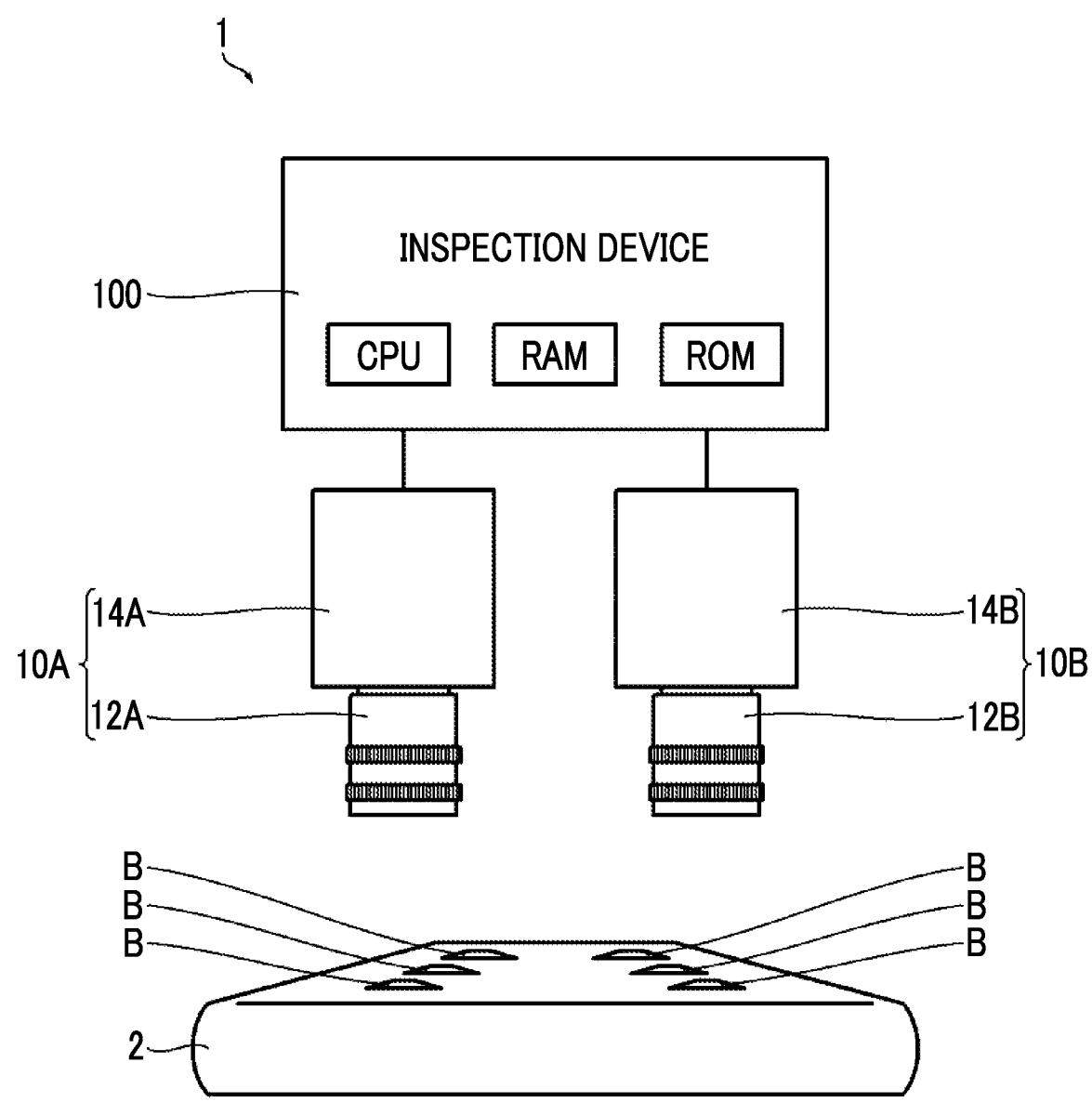
FIG. 1 is a system configuration diagram showing an example of an inspection system to which an image processing system according to the invention is adapted.

FIG. 1 is a system configuration diagram showing an example of an inspection system to which an image processing system according to the invention is adapted.

As shown in FIG. 1, an inspection system 1 according to the embodiment is configured as a system that continuously inspects substrates B continuously conveyed by a conveyor 2. In particular, the inspection system 1 according to the embodiment is configured as a system that inspects a length of the substrate B. That is, the inspection system 1 is configured as a system that inspects whether the length of the substrate B satisfies a criterion set in advance.

《Inspection Target》

Figure 2:
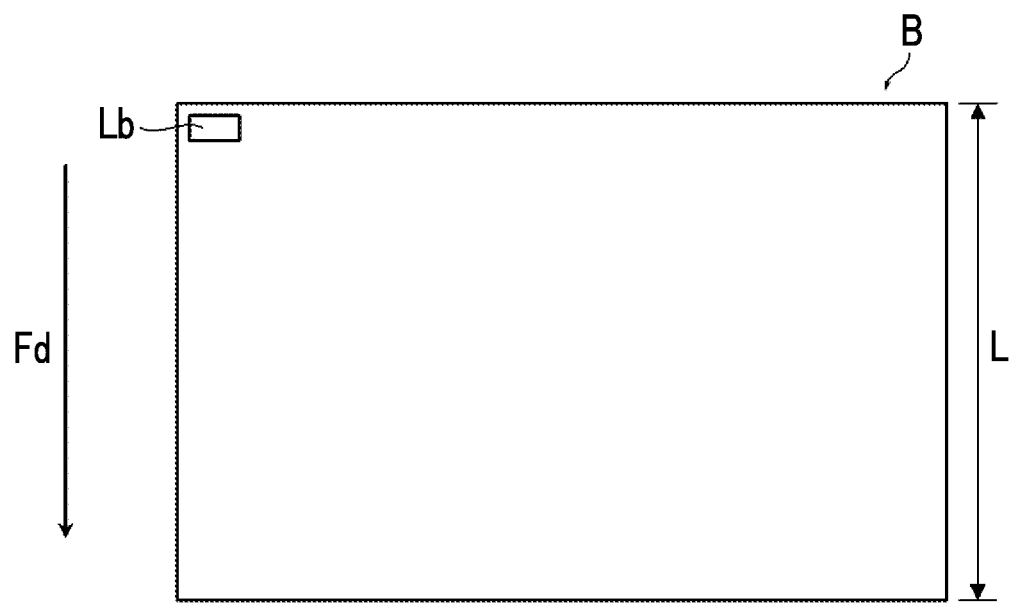
FIG. 2 is a plan view showing an example of a substrate which is an inspection target.

FIG. 2 is a plan view showing an example of a substrate which is an inspection target.

As shown in FIG. 2, the substrate B which is the inspection target has a laterally-long rectangular shape in a plan view.

The inspection system 1 measures a length (short-side length) L in the longitudinal direction of the substrate B and determines whether the measured length L satisfies the criterion set in advance. The pass or fail of the substrate B is determined based on the determination result. That is, the substrate B is determined as OK in a case where the measured length L satisfies the criterion, and the substrate B is determined as No Good (NG) in a case where the measured length L does not satisfy the criterion.

The criterion is set with a constant width. For example, it is assumed that a range of the length to be OK is Lmin≤L≤L-max. In this case, the substrate B is set as OK in a case where the measured length L is Lmin or more and Lmax or less.

In the case of the inspection, the discrimination of a label Lb is also performed. That is, it is discriminated what kind of label is assigned to the substrate B.

《System Configuration》

As shown in FIG. 1, the inspection system 1 is configured to comprise two cameras 10A and 10B that image the substrates B conveyed by the conveyor 2 and an inspection device 100 that acquires pieces of image data individually from the two cameras 10A and 10B to inspect the imaged substrates B by image processing.

<Conveyer>

The conveyor 2 conveys the substrate B to be inspected along a predetermined conveyance path. In the embodiment, the substrate B is horizontally conveyed along a straight line.

The substrates B are conveyed in two rows on the conveyor 2. The substrates B are disposed and conveyed at regular intervals in each row.

In FIG. 2, a direction indicated by an arrow Fd is a conveyance direction of the substrate B. The substrate B is conveyed in parallel with the short side.

<Camera>

The two cameras 10A and 10B are examples of a plurality of imaging units. The two cameras 10A and 10B are installed on the conveyance path of the substrate B by the conveyor 2. Hereinafter, in order to discriminate the two cameras 10A and 10B, one camera 10A is set as a first camera 10A and the other camera 10B is set as a second camera 10B.

[First Camera]

The first camera 10A outputs a captured image as digital data. The first camera 10A is composed of an imaging lens 12A and a camera body 14A.

The imaging lens 12A is an example of an optical system. The imaging lens 12A according to the embodiment is a single focus imaging lens and comprises a stop and a focus mechanism. The imaging lens 12A is mounted attachably and detachably on the camera body 14A through a mount.

The camera body 14A images an image formed by the imaging lens 12A and outputs the image as digital image data. The camera body 14A is provided with an image sensor as means for imaging the image formed by the imaging lens 12A. The camera body 14A is provided with a signal processing unit as means for processing a signal output from the image sensor to generate the image data. A solid-state imaging element such as a complementary metal oxide semiconductor (CMOS) or a charged coupled device (CCD) is used as the image sensor.

The first camera 10A images the substrates B in one side row (left side row in FIG. 1) of the substrates B conveyed in two rows by the conveyor 2. Therefore, the first camera 10A is installed at a position where the substrates B in one side row can be imaged. This position is a position where the whole image of the substrate B to be inspected can be imaged in one frame.

[Second Camera]

The configuration of the second camera 10B is the same as the configuration of the first camera 10A. That is, the second camera 10B is composed of an imaging lens 12B and a camera body 14B. Specifications of the imaging lens 12B and the camera body 14B are also the same as specifications of the imaging lens 12A and the camera body 14A of the first camera 10A.

The second camera 10B images the substrates B in the other side row (right side row in FIG. 1) of the substrates B conveyed in two rows by the conveyor 2. Therefore, the second camera 10B is installed at a position where the substrates B in the other side row can be imaged. This position is a position where the whole image of the substrate B to be inspected can be imaged in one frame.

<Inspection Device>

The inspection device 100 is an example of an image processing device. The inspection device 100 acquires the pieces of image data from the first camera 10A and the second camera 10B and individually performs the image processing of the acquired pieces of image data to inspect the imaged substrates B. That is, the length L of the imaged substrate B is measured and it is determined whether the measured length L satisfies the criterion to determine pass or fail of the substrate.

The inspection device 100 is composed of a computer comprising a central processing unit (CPU), a random access memory (RAM), and a read only memory (ROM). That is, the computer executes a predetermined program to function as the inspection device 100. An example of the computer can be a personal computer.

Figure 3:
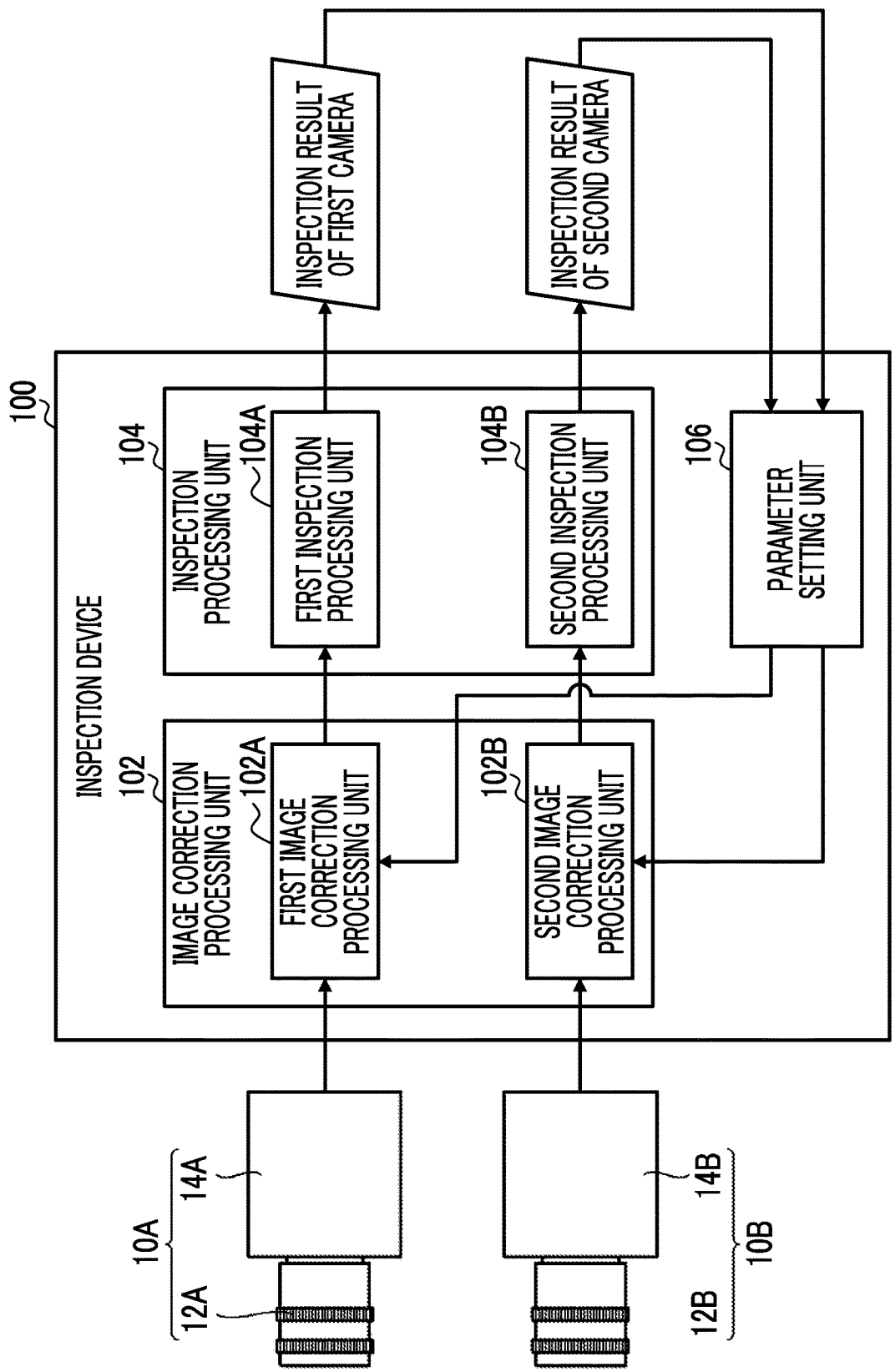
FIG. 3 is a block diagram of functions provided in an inspection device.

FIG. 3 is a block diagram of functions provided in the inspection device.

As shown in FIG. 3, the inspection device 100 comprises a function (the first image processing function) as an image correction processing unit 102 that performs correction processing of the pieces of image data acquired from the first camera 10A and the second camera 10B, a function (second image processing function) as an inspection processing unit 104 that acquires the pieces of image data after the correction from the image correction processing unit 102 to inspect the imaged substrates B by the pieces of image processing, and a function (parameter setting function) as a parameter setting unit 106 that sets a parameter of the pieces of image processing (image correction processing) performed by the image correction processing unit 102. The computer constituting the inspection device 100 executes predetermined programs (image processing program and the like) to provide these functions. The programs are stored in, for example, the ROM.

[Image Correction Processing Unit]

The image correction processing unit 102 is an example of a first image processing unit. The image correction processing unit 102 comprises a first image correction processing unit 102A that performs the correction processing of the image data acquired from the first camera 10A and a second image correction processing unit 102B that performs the correction processing of the image data acquired from the second camera 10B.

The first image correction processing unit 102A acquires the image data of the first camera 10A to correct image deterioration caused by the first camera 10A by the image processing.

Here, there are various types of image deterioration caused by the first camera 10A, such as deformation of an image and degradation of resolution.

The target to be corrected by the first image correction processing unit 102A is not all of the pieces of image deterioration caused by the first camera 10A but image deterioration that affects the inspection in a subsequent stage.

Since the length L of the substrate B is inspected in the inspection system 1 according to the embodiment, image deterioration that affects the inspection of the length L is corrected. The image deterioration that affects the inspection of the length L is mainly the deformation of an image. Therefore, in the inspection system 1 according to the embodiment, the deformation of the image is corrected by the first image correction processing unit 102A. The correction is performed according to a type of the occurred deformation. For example, in a case where distortion occurs, a distortion correction is performed. In a case where a trapezoidal deformation occurs, a trapezoidal deformation correction is performed. A known image processing method is employed for the correction.

Here, an object of the correction is not to completely remove the image deterioration but to reduce a variation in inspection results due to a performance difference in the used cameras. That is, the object of the correction is to match the inspection results within a desired range in a case where the same targets are imaged by the first camera 10A and the second camera 10B. This point will be described below.

The second image correction processing unit 102B acquires the image data of the second camera 10B to correct the image deterioration caused by the second camera 10B by the image processing. The target to be corrected is the same as that of the first image correction processing unit 102A, which is the deformation of the image.

[Inspection Processing Unit]

The inspection processing unit 104 is an example of a second image processing unit.

The inspection processing unit 104 comprises a first inspection processing unit 104A that acquires the image data after the correction from the first image correction processing unit 102A to inspect the imaged substrate B by the image processing and a second inspection processing unit 104B that acquires the image data after the correction from the second image correction processing unit 102B to inspect the imaged substrate B by the image processing.

The first inspection processing unit 104A acquires the image data after the correction from the first image correction processing unit 102A to inspect the imaged substrate B by the image processing. The first inspection processing unit 104A discriminates the label Lb assigned to the substrate B simultaneously with the inspection. That is, it is recognized and discriminated what kind of label is assigned to the substrate B by the image processing.

The first inspection processing unit 104A inspects the length L of the substrate B as described above. That is, it is inspected whether the length L of the imaged substrate B satisfies the criterion. First, the first inspection processing unit 104A extracts the substrate B from the obtained image data. Next, the length L in the longitudinal direction of the extracted substrate B is measured by the image processing. Next, it is determined whether the length L of the substrate B obtained by the measurement satisfies the criterion. In a case where the criterion is satisfied, it is determined as OK. On the other hand, in a case where the criterion is not satisfied, it is determined as NG. A known image processing method is employed for the extraction and measurement of the inspection target. A known image processing method is also employed for the discrimination of the label Lb.

The second inspection processing unit 104B is an example of the second image processing unit. The second inspection processing unit 104B acquires the image data after the correction from the second image correction processing unit 102B to inspect the imaged substrate B by the image processing. The second inspection processing unit 104B discriminates the label Lb assigned to the substrate B simultaneously with the inspection.

The second inspection processing unit 104B inspects the length L of the substrate B similarly to the first inspection processing unit 104A. The inspection method is also same as that of the first inspection processing unit 104A. That is, the first inspection processing unit 104A and the second inspection processing unit 104B perform the same image processing with respect to the acquired pieces of image data to inspect the imaged substrate B. The first inspection processing unit 104A and the second inspection processing unit 104B perform the same image processing with respect to the acquired pieces of image data to discriminate the label Lb assigned to the substrate B.

[Parameter Setting Unit]

The parameter setting unit 106 individually sets the parameter of the pieces of image processing (image correction processing) performed by the first image correction processing unit 102A and the second image correction processing unit 102B. The parameter is set such that the inspection results of the first inspection processing unit 104A and the second inspection processing unit 104B match within a desired range in a case where the first camera 10A and the second camera 10B image the same targets.

Here, the "match within a desired range" means that the inspection results thereof match at a level of accuracy required for the inspection or the like. Therefore, it is desirable that the correction is performed such that the results of the inspection or the like match where an error is allowed within a constant range. That is, the correction may be performed such that the results thereof substantially match. The same targets herein include targets that can be regarded as substantially the same targets.

It is possible to inspect the targets with high accuracy by setting the parameter and correcting the pieces of image data in this manner even in a case where the cameras having an individual difference are used. Hereinafter, this point will be described in detail.

[Concept of Correction by Image Correction Processing Unit]

The first camera 10A and the second camera 10B use cameras having the same specification. In a case where there is no difference in the performance of the cameras to be used, quality of the image data obtained from the first camera 10A and quality of the image data obtained from the second camera 10B substantially match. In this case, in a case where the same targets are imaged by the first camera 10A and the second camera 10B, the inspection results (determination result of pass or fail of substrate and discrimination result of label) of the first inspection processing unit 104A and the second inspection processing unit 104B substantially match.

However, there is usually the individual difference in the cameras. In a case where there is a difference in the performance of the cameras used as the first camera 10A and the second camera 10B, the quality of the image data obtained from the first camera 10A is different from the quality of the image data obtained from the second camera 10B. In this case, there may be a difference between the inspection result of the first inspection processing unit 104A and the inspection result of the second inspection processing unit 104B even in a case where the same targets are imaged.

In the inspection device 100 according to the embodiment, the difference in the inspection results caused by the difference in the performance of the cameras is eliminated by the correction processing by the first image correction processing unit 102A and the second image correction processing unit 102B. That is, pieces of image data of targets to be processed are corrected in advance by the first image correction processing unit 102A and the second image correction processing unit 102B such that the difference in the inspection results does not occur even in a case where there is the difference in the performance of the cameras to be used. Accordingly, it is possible to inspect the targets with high accuracy using the pieces of image data acquired even in the case where there is the difference in the performance of the first camera 10A and the second camera 10B.

Here, the difference in the cameras includes a performance difference based on the accuracy of the mount, a performance difference based on mounting accuracy of the imaging lens on a camera body, a performance difference based on an inclination, sensitivity, or the like of the image sensor in the camera, and the like in addition to a performance difference based on a difference in optical performance of the mounted imaging lens. This is because the difference in the inspection results may occur due to a shift, an inclination, or the like of an optical axis caused by the difference in the accuracy of the mount, the difference in the mounting accuracy, the inclination of the image sensor, and the like. Further, this is because the difference in the inspection results may also occur due to the difference in the sensitivity of the image sensor provided in the camera.

Hereinafter, the correction performed by the image correction processing unit will be described with a specific example. Here, a case of correcting the trapezoidal deformation will be described as an example.

FIGS. 4A and 4B are views showing examples of pieces of original image data to be acquired from the first camera and the second camera in the case where the same targets are imaged. FIG. 4A shows the example of the original image data to be acquired from the first camera 10A. FIG. 4B shows the example of the original image data to be acquired from the second camera 10B.

As shown in FIGS. 4A and 4B, the trapezoidal deformation occurs in the pieces of original image data of both the first camera 10A and the second camera 10B. However, a deformation amount of image data i0b to be acquired from the second camera 10B is larger than that of image data i0a to be acquired from the first camera 10A.

In FIGS. 4A and 4B, images of the substrate to be imaged in a case where the deformation does not occur are displayed by broken lines in a superimposed manner for comparison.

FIGS. 5A and 5B are views showing examples of pieces of image data after the trapezoidal deformation correction. FIG. 5A shows the example in a case where the trapezoidal deformation correction is performed with respect to the image data acquired from the first camera 10A. FIG. 5B shows the example in a case where the trapezoidal deformation correction is performed with respect to the image data acquired from the second camera 10B.

FIGS. 5A and 5B are examples in a case where each piece of image data is corrected without considering the inspection results. In this case, each piece of image data is independently corrected and is corrected such that the deformation is completely removed. That is, each piece of image data is corrected so as to have a completely ideal image shape. As a result, as shown in FIG. 5A, image data i1a after the correction of the first camera 10A is corrected so as to have the same rectangular shape as an actual substrate shape. As shown in FIG. 5B, image data i1b after the correction of the second camera 10B is also corrected so as to have the same rectangular shape as the actual substrate shape.

In a case where the substrate is inspected based on the pieces of image data i1a and i1b corrected in this manner, it is possible to match the inspection results of both inspection processing units for the inspection of the length L of the substrate B.

However, there may be a difference in the results of both inspection processing units for the result of the discrimination of the label Lb assigned to the substrate B. This is due to the following reason. In the pieces of original image data, the deformation amount of the image data i0b of the second camera 10B is larger than that of the image data i0a of the first camera 10A (refer to FIG. 4). For this reason, in a case where the correction is performed such that the deformation is completely removed, a correction amount of the image data i1b after the correction of the second camera 10B is larger than that of the image data i1a after the correction of the first camera 10A. As a result, a resolution of the image data i1b after the correction of the second camera 10B is reduced and thus it may not be possible to discriminate the label Lb.

Figures 6A, 6B:
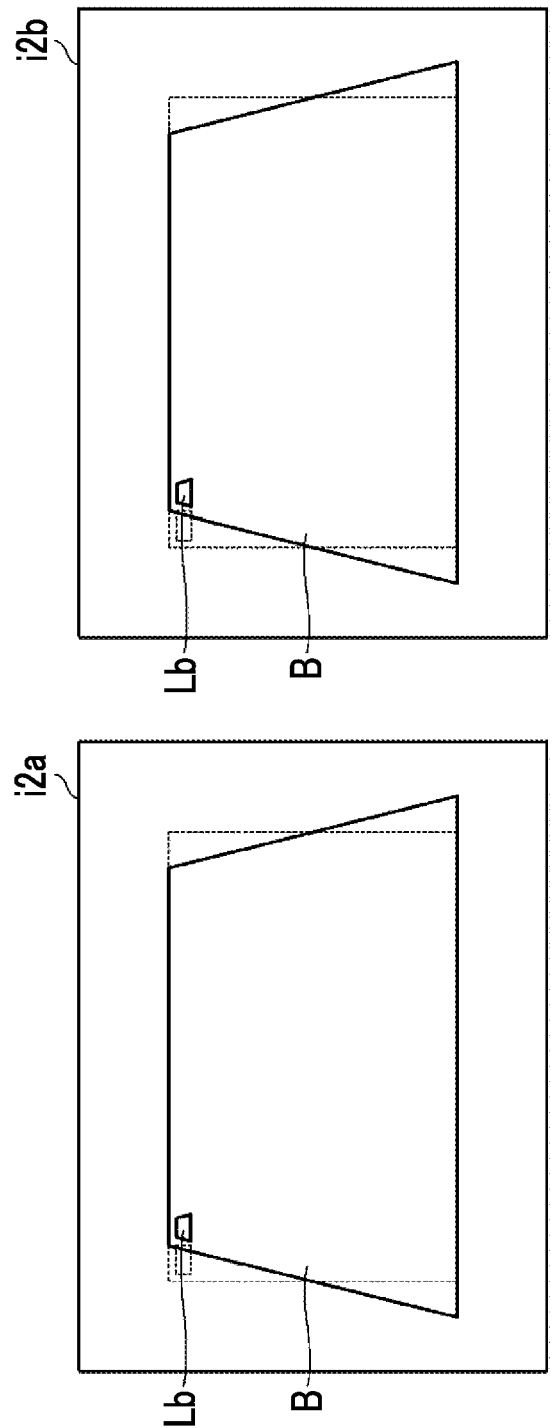
FIGS. 6A and 6B are views showing examples of pieces of image data in a case where the correction is performed such that inspection results are the same.

FIGS. 6A and 6B are views showing examples of pieces of image data in a case where the correction is performed such that the inspection results are the same. FIG. 6A shows the example in a case where the correction is performed with respect to the image data acquired from the first camera 10A. FIG. 6B shows the example in a case where the correction is performed with respect to the image data acquired from the second camera 10B. In FIGS. 6A and 6B, images of the substrate in a case where the deformation is completely corrected are displayed by broken lines in a superimposed manner for comparison.

As shown in FIGS. 6A and 6B, in the case where the correction is performed such that the inspection results are the same, image data i2a after the correction of the first camera 10A and image data i2b after the correction of the second camera 10B are substantially the same image data.

In the case where the correction is performed such that the inspection results are the same, there is a case where residual deformation is allowed as shown in FIGS. 6A and 6B. That is, in the case where the correction is performed such that the inspection results are the same, residual deterioration is allowed for an item that does not affect the inspection results. In this example, since the length L in the longitudinal direction of the substrate B is inspected, deformation in the lateral direction of the substrate B is allowed. On the other hand, since the residual deformation affects the discrimination of the label Lb, the correction is limited. That is, the correction is performed in a range where the discrimination of the label Lb is possible.

In this manner, in the inspection system 1 according to the embodiment, in the case where the first camera 10A and the second camera 10B image the same targets, the pieces of image data are corrected by the first image correction processing unit 102A and the second image correction processing unit 102B such that the difference in the inspection results of the first inspection processing unit 104A and the second inspection processing unit 104B does not occur, that is, the inspection results thereof match within a desired range.

The parameter setting unit 106 sets the parameter of the image processing such that such a correction is performed. That is, in the case where the same targets are imaged, the parameter for matching the inspection results within a desired range is set.

The parameter is set by, for example, feeding back the inspection results. For example, the parameter of the pieces of image processing to be set in the first image correction processing unit 102A and the second image correction processing unit 102B is optimized based on change states of the inspection results while all parameters are minutely changed in sequence. In this case, it is preferable not to change a parameter that has no sensitivity, that is, does not affect the inspection results even in a case where the parameter is changed.

The change states of the inspection results are observed by, for example, obtaining a partial differential of the difference in the inspection results according to the change in the parameter.

In a case where the parameter is optimized, for example, probability distributions of the inspection results are made to be substantially the same in the first inspection processing unit 104A and the second inspection processing unit 104B.

A known optimization method can be employed as the method of optimizing the parameter by minutely changing the parameter in this manner. For example, the optimization method by a known gradient method can be employed. However, since it is necessary for a parameter not to change in the case where the parameter has no sensitivity, it is preferable to employ a method including a regularization term such as dumped least squares (DLS).

In a case where the parameter is optimized simply such that the inspection results are the same, there may be a case where a substrate originally to be determined as OK is determined as NG. For this reason, in the case where the parameter is set, the accuracy of the inspection is also considered. For example, an accurate inspection result is prepared and the parameter is set so as to be the same as the inspection result. In the case of this example, for example, the parameter is set such that the inspection result of the first inspection processing unit 104A is guaranteed to be right and the inspection result of the second inspection processing unit 104B substantially matches the inspection result of the first inspection processing unit 104A.

[Action of Inspection System]

«Initial Setting»

First, as an initial setting, the parameter of the pieces of image processing performed by the first image correction processing unit 102A and the second image correction processing unit 102B is set by the parameter setting unit 106. That is, the parameter of the pieces of image processing by the first image correction processing unit 102A and the second image correction processing unit 102B is adjusted and set such that the inspection results of the first inspection processing unit 104A and the second inspection processing unit 104B substantially match in a case where the first camera 10A and the second camera 10B image the same targets. Accordingly, it is possible to appropriately perform the inspection even in the case where there is the difference in the performance of the first camera 10A and the second camera 10B such as a case where there is the individual difference in the mounted imaging lenses.

«Processing Procedure of Inspection»

The inspection is performed by imaging the substrates B conveyed in two rows on the conveyor 2 by the first camera 10A and the second camera 10B.

The pieces of image data output from the first camera 10A and the second camera 10B are captured into the inspection device 100 and provided for the inspection. The inspection device 100 processes the pieces of image data by the next procedure (image processing method) to inspect the imaged substrates.

For the image data of the first camera 10A and the image data of the second camera 10B captured into the inspection device 100, first, the image deterioration caused by the optical system is corrected by the image processing in the first image correction processing unit 102A and the second image correction processing unit 102B (first image processing step). In this example, the trapezoidal deformation is corrected. In this case, the image data acquired from the first camera 10A is subjected to the image processing in the first image correction processing unit 102A to correct the trapezoidal deformation. The image data acquired from the second camera 10B is subjected to the image processing in the second image correction processing unit 102B to correct the trapezoidal deformation.

Here, as described above, the parameter of the pieces of image processing performed by the first image correction processing unit 102A and the second image correction processing unit 102B is set in advance (parameter setting step). The parameter is set such that the inspection results substantially match in the case where the same targets are imaged. The first image correction processing unit 102A and the second image correction processing unit 102B perform the pieces of image processing of the pieces of image data in accordance with the set parameter to correct the trapezoidal deformation occurring in the images.

The image data of the first camera 10A and the image data of the second camera 10B for which the trapezoidal deformation is corrected by the first image correction processing unit 102A and the second image correction processing unit 102B are next added to the first inspection processing unit 104A and the second inspection processing unit 104B, and provided for the inspection (second image processing step).

The first inspection processing unit 104A acquires the image data subjected to the correction processing in the first image correction processing unit 102A and performs the image processing of the acquired image data to inspect the length of the imaged substrate. More specifically, the length L in the longitudinal direction of the imaged substrate is measured and it is determined whether the measured length satisfies the criterion set in advance to determine pass or fail of the substrate. Further, the acquired image data is subjected to the image processing to discriminate the label assigned to the substrate.

The second inspection processing unit 104B acquires the image data subjected to the correction processing in the second image correction processing unit 102B and performs the image processing of the acquired image data to inspect the length of the imaged substrate. Further, the acquired image data is subjected to the image processing to discriminate the label assigned to the substrate.

Here, the pieces of image data to be processed in the first inspection processing unit 104A and the second inspection processing unit 104B are the pieces of image data subjected to the correction processing in the first image correction processing unit 102A and the second image correction processing unit 102B and the pieces of image data corrected such that substantially the same result is obtained in the case where the same targets are imaged. Therefore, it is possible to appropriately inspect the targets with individual cameras even in the case where there is a difference in the performance of the first camera 10A and the second camera 10B.

In this manner, with the inspection system 1 according to the embodiment, it is possible to appropriately inspect the targets with individual cameras even in the case where the inspection is performed by using the plurality of cameras. In particular, it is possible to appropriately inspect the targets even in the case where the cameras having the individual difference are used. Further, it is possible to appropriately inspect the targets even in the case where the imaging lenses having the individual difference in individual cameras are used.

Since the pieces of processing performed by the first inspection processing unit 104A and the second inspection processing unit 104B do not need to be changed and thus can be adapted even in a case where algorithm of an inspection is unknown (so-called black box). This is particularly effective in a case where a method such as the machine learning is employed for the inspection.

With the inspection system 1 according to the embodiment, since the image deterioration caused by the camera is directly operated, it is possible to adjust the image deterioration with a high degree of freedom.

Second Embodiment

FIG. 7 is a block diagram of functions provided in an inspection device according to a second embodiment.

As shown in FIG. 7, an inspection device 110 according to the embodiment is different from the inspection device 100 according to the first embodiment in that a preprocessing unit 112 is further provided. Therefore, only a function of the preprocessing unit 112 will be described herein.

The preprocessing unit 112 is an example of a third image processing unit. The preprocessing unit 112 performs pieces of preprocessing of pieces of image data acquired from the first camera 10A and the second camera 10B. The pieces of preprocessing herein mean that predetermined pieces of image processing are performed before the pieces of image data are subjected to the correction processing in the image correction processing unit 102. Specifically, processing of correcting and uniformizing a variation in image quality occurring between the first camera 10A and the second camera 10B due to a difference in an imaging environment is performed by the pieces of image processing. Examples of the variation in image quality occurring due to the difference in the imaging environment are a brightness variation, a tone variation, and the like of the image.

The preprocessing unit 112 comprises a first preprocessing unit 112A and a second preprocessing unit 112B. The first preprocessing unit 112A performs the image processing of image data acquired from the first camera 10A to correct the image quality. The second preprocessing unit 112B performs the image processing of image data acquired from the second camera 10B to correct the image quality. For example, in a case where there is a difference in the brightness of the images to be imaged due to a difference in a striking way of illumination light in an imaging region of the first camera 10A and an imaging region of the second camera 10B, the brightness of the image is corrected by the preprocessing unit 112.

In this manner, the preprocessing unit 112 corrects and uniformizes the variation in image quality occurring due to the difference in the imaging environment (third image processing step). The image correction processing unit 102 captures the image processed by the preprocessing unit 112 to perform the correction processing (first image processing step). Accordingly, it is possible to remove the variation in image quality occurring due to the difference in the imaging environment and thus inspect the targets more appropriately.

A computer constituting the inspection device 110 executes a predetermined program (image processing program or the like) to provide the function (third image processing function) of the preprocessing unit 112.

The function of the preprocessing unit 112 may be provided in the first camera 10A and the second camera 10B. That is, the function of the preprocessing unit 112 may be provided in the signal processing units provided in the camera bodies 14A and 14B of the first camera 10A and the second camera 10B.

Another Embodiment

[Processing with Respect to Imaged Target]

In the above embodiments, the case where the invention is adapted to the system that inspects the targets is described. However, the adaption of the invention is not limited thereto. In addition, the invention can be adapted to a system, a device, and the like that measure, recognize, or the like the target.

The system, device, and the like that measure the target refer to a system, device, and the like that acquire image data in which the target is imaged and measure the target by the image processing. Examples of the measurement are measurement of a length, measurement of an area, measurement of a color, and measurement of a position.

The system, device, and the like that recognize the target refer to a system, device, and the like that acquire the image data in which the target is imaged and recognize the target by the image processing. Examples of the recognition are recognition of a character, recognition of a figure, recognition of an appearance shape, and recognition of a specific target subject.

In the above embodiments, the case where the length of the target is inspected as the inspection is described. However, the type of inspection is not limited thereto. The invention can be adapted to various inspections using the image processing such as the inspection of an appearance shape, the inspection of a surface shape, the inspection of a position, the inspection of a size, and the inspection of a type. Further, in a case where the pieces of processing such as the measurement, the recognition, and the like are performed by the image processing with the inspection, the invention can also be adapted to these pieces of processing.

[Configuration of System Performing Inspection or the Like]

In the above embodiments, the case where the targets conveyed by the conveyor are sequentially imaged and processed is described. However, the configuration of the system performing the inspection or the like is not limited thereto. In addition, for example, the invention can be adapted to a system and the like, in which a plurality of cameras are installed on a vehicle to recognize people and the like.

In the above embodiments, each camera images the different target. However, the invention can be adapted to a system in which each camera images the same target for the inspection or the like. Further, the invention can be adapted to a system in which a plurality of cameras image different portions of the same target for the inspection or the like. For example, the invention can be adapted to a system in which a surface of one substrate is divided into a plurality of regions and different cameras image each region to inspect presence of a flaw, a foreign substance, or the like.

In the above embodiments, the case where the two cameras are used is described. However, the number of cameras to be used is not limited thereto. A plurality of cameras may be used. The imaging lens may be integrally assembled to the camera body.

Further, the invention can be adapted to a case where a continuous subject such as a web is inspected or the like. For example, the invention can be adapted to a case where the surface of the web conveyed continuously is imaged by a plurality of cameras to inspect the presence of a flaw or the like, recognize or discriminate a mark displayed at predetermined intervals or the like, or the like.

[Correction Target of Image Correction Processing Unit (First Image Processing Unit)]

As described above, the image deterioration that affects the results of the inspection or the like in the subsequent stage is corrected by the image processing in the image correction processing unit 102.

For example, in a system that recognizes a character, a figure, or the like assigned to the target, a system that measures a position of the target for performing registration, positioning, or the like of the target, and the like, the deformation of the image, degradation of resolution, and the like caused by the optical system mainly affect recognition results. Therefore, the deformation of the image and the resolution caused by the optical system are mainly corrected in these types of systems. The deformation of the image is corrected by using a known deformation correction technique such as a known deformation correction technique or the above trapezoidal deformation correction technique. The resolution is corrected by using, for example, a known point image restoration processing technique. The point image refers to an optical image obtained in a case where a point subject passes through the imaging lens. In a case where there is aberration or diffraction in the imaging lens, a point does not become a point but a spread point image (blurred point image) is obtained. That is, the point image represents an optical deterioration state of the imaging lens. The point image restoration processing is image processing that brings the optical deterioration close to an original state.

The deformation of the image caused by the optical system mainly affects a processing result in a system that measures, inspects, or the like of a shape of the target. Therefore, the deformation of the image caused by the optical system is mainly corrected in this type of system.

In the system that measures, inspects, or the like the area, the length, and the like of the target, the deformation of the image caused by the optical system and a difference in an image magnification of each optical system affect the processing result. Therefore, the deformation of the image caused by the optical system and the image magnification are mainly corrected in this type of system. The image magnification is corrected by performing expansion and contraction processing (also referred to as electronic zoom, digital zoom, or the like) of the image data.

In the system that measures, inspects, or the like the color of the target, a difference in spectral transmittance of each optical system mainly affects the processing result. Therefore, the difference in spectral transmittance thereof is mainly corrected in this type of system.

Another Embodiment

In the above embodiments, the first image processing unit, the second image processing unit, the third image processing unit, and the parameter setting unit are composed of the computers. However, the hardware configurations for realizing the first image processing unit, the second image processing unit, the third image processing unit, and the parameter setting unit are not limited thereto. These processing units and the like can be composed of various processors. Examples of various processors are a CPU which is a general purpose processor that functions as a processing unit executing software (program) to perform various pieces of processing, a programmable logic device (PLD) which is a processor capable of changing a circuit configuration after manufacturing such as a field programmable gate array (FPGA), and a dedicated electric circuit having a circuit configuration specially designed for executing specific processing such as an application specific integrated circuit (ASIC).

One processing unit may be composed of one of these various processors or may be composed of the same type or different types of two or more processors. For example, one processing unit may be composed of a plurality of FPGAs or may be composed of a combination of the CPU and the FPGA.

A plurality of processing units may be composed of one processor. As an example in which the plurality of processing units is composed of one processor, first, there is a form that one processor is composed by combining one or more CPUs, as represented by a computer such as a client or a server, and software, and the processor functions as the plurality of processing units. Second, there is a form that a processor, as represented by a system on chip (SoC) or the like, realizing the entire function of a system including the plurality of processing units with one integrated circuit (IC) chip is used. In this manner, various processing units are composed of one or more various processors described above as hardware configuration.

Furthermore, the hardware configurations of these various processors are, more specifically, electric circuits that combine circuit elements such as a semiconductor element.

EXAMPLE

Hereinafter, in the inspection system 1 according to the first embodiment described above, one example of the case where the parameter of the pieces of image processing performed by the first image correction processing unit 102A and the second image correction processing unit 102B is set such that the inspection results of the first inspection processing unit 104A and the second inspection processing unit 104B match within a desired range will be described.

In this example, the case where the first image correction processing unit 102A and the second image correction processing unit 102B perform the trapezoidal deformation correction will be described.

Further, in this example, the case where each parameter is optimized by the gradient method will be described.

[Trapezoidal Deformation Correction]

In general, the trapezoidal deformation is corrected by projective transformation.

In a case where point(x0, y0) of an input image is converted to a position of point(x1, y1), the coordinate conversion is defined by the following equation.

$$x1=(a1*x0+b1*y0+c1)/(a0*x0+b0*y0+c0); \text{ and}$$

$$y1=(a2*x0+b2*y0+c2)/(a0*x0+b0*y0+c0).$$

The * in equation means multiplication (hereinafter the same).

The parameters are collectively expressed as a parameter vector θ=(a0, b0, c0, a1, b1, c1, a2, b2, c2).

[Definition of Symbol]

IAn: n-th teacher image (image imaged by first camera 10A whose determination result of pass or fail is known, 1≤n≤N);

TAn: Determination result of pass or fail of the n-th teacher image (in case of OK: 1 and in case of NG: 0); and MAm, MBm: Comparison image for m-th result matching (1≤m≤M, M>>N, M≥dimθ); dimθ is a dimension of θ vector.

Y=g(X|θ): Image correction processing that corrects an input image X and converts the image into an image Y (θ is parameter vector); and D=f(X): Identification algorithm that returns a probability (0≤D≤1) that the input image X is OK (inspection algorithm).

[Parameter Required to be Prepared]

Δθ: Minute change amount of a parameter;

Vth: Threshold value indicating a degree of result matching to be desired;

Tth: Nonlinear optimization discontinuation threshold value;

λ: Constant that defines a balance between accuracy of the determination result in the first camera and the degree of the determination result matching between the first camera and the second camera;

θ0: Initial parameter vector; and

ε: Update amount of steepest descent method.

[Description of Variable]

θ: Current parameter vector; and itr: Number of repetitions of the nonlinear optimization.

[Implementation Procedure]

Figure 8:
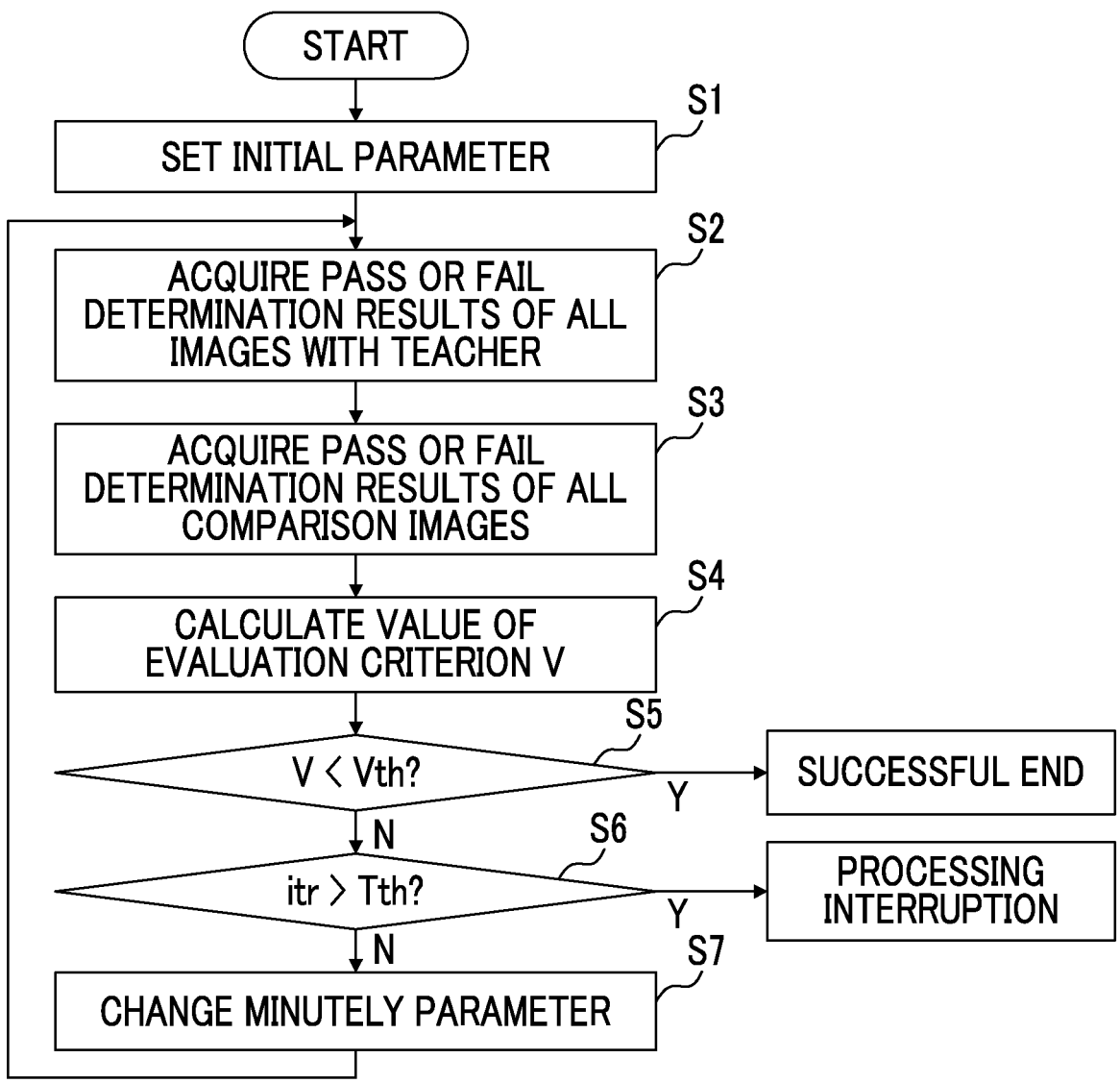
FIG. 8 is a flowchart showing a procedure of processing of optimizing a parameter.

FIG. 8 is a flowchart showing a procedure of processing of optimizing a parameter of the image processing.

The procedure of optimizing the parameter of the image processing is as follows.

(1) Set Initial Parameter (Step S1)

First, the initial parameter vector θ0 is set (θ←θ0). The number of repetitions of the nonlinear optimization itr is set to one (itr 1).

(2) Acquire Pass or Fail Determination Results of all Images with Teacher (Step S2)

Next, the pass or fail determination results of all the images with teacher are acquired as a probability YAn.

$$YAn=f(g(IAn|\theta))$$

(3) Acquire Pass or Fail Determination Results of all Comparison Images (Step S3)

Next, the pass or fail determination results of all the comparison images are acquired as probabilities ZAm and ZBm.

$$ZAm=f(g(MAm|\theta))$$

$$ZBm=f(g(MBm|\theta))$$

(4) Calculate Value of Evaluation Criterion V (Step S4)

Next, the value of the evaluation criterion V is calculated. The evaluation criterion V is defined as a sum of cross entropy and λ times of Kullback divergence as in the following equation.

$$V=(-1/N)*\Sigma nTAn*\log(YAn)+\lambda*(-1/M)*\log(ZAm)$$

(5) Determination (Step S5)

Next, the calculated value of the evaluation criterion V is compared with the threshold value Vth to determine whether the calculated value of the evaluation criterion V is less than the threshold value Vth. In a case where the calculated value of the evaluation criterion V is less than the threshold value (V<Vth), the processing successfully ends.

(6) Determination (Step S6)

In the determination in step S5 described above, in a case where the calculated value of the evaluation criterion V is equal to or larger than the threshold value (V≥Vth), the number of repetitions of the nonlinear optimization itr is compared with a threshold value Tth to determine whether the number of repetitions of the nonlinear optimization itr exceeds the threshold value Tth. In a case where the number of repetitions of the nonlinear optimization itr exceeds the threshold value Tth (itr>Tth), the processing is interrupted, assuming that a desired correction effect cannot be obtained. In this case, it is necessary to review a correction algorithm and an imaging system.

(7) Change Minutely Parameter (Step S7)

In step S6 described above, in a case where the number of repetitions of the nonlinear optimization itr is equal to or less than the threshold value (itr≤Tth), the parameter is minutely changed. This processing is performed by the following procedure.

A parameter vector obtained by adding $\Delta\theta$ to an i-th element of the parameter vector $\theta$ is expressed by $\theta+\Delta\theta i$. The parameter is replaced by $\theta+\Delta\theta i$ for all i of $1 \leq i \leq \dim\theta$ and the calculations in steps S2 to S4 described above are repeated to obtain a value Vi of the evaluation criterion V in each case.

$$YAni=f(g(IAn|\theta+\Delta\theta i));$$

$$ZAmi=f(g(MAm|\theta+\Delta\theta i));$$

$$ZBmi=f(g(MBm|\theta+\Delta\theta i));\ and$$

$$Vi=(-1/N)*\Sigma/nTAni*\log(YAni)+\lambda*(-1/M)*\Sigma/mZBmi*\log(ZAmi).$$

Next, an approximation of a gradient by the parameter vector $\theta$ of the evaluation criterion V is obtained.

$$dVi/d\theta=(Vi-V)/\Delta\theta;\ and$$

$$dV/d\theta=(dV1/d\theta,dV2/d\theta,\ldots,dVk/d\theta),k=\dim\theta.$$

Next, $\theta$ is shifted in a direction where the value of the evaluation criterion V decreases.

$$\theta \leftarrow \theta-\varepsilon*dV/d\theta.$$

With this, the processing of minutely changing the parameter is completed.

After the parameter is minutely changed, the processing returns to step S2 described above to execute again the subsequent pieces of processing after step S2. The pieces of processing of steps S2 to S7 are repeatedly implemented until the processing successfully ends or is interrupted.

It is possible to match the inspection results within a desired range by optimizing the parameter of the image processing as described above. On the other hand, it is possible to significantly suppress the number of pieces of determination teacher data which is expensive to prepare.

EXPLANATION OF REFERENCES

1: inspection system
2: conveyer
10A: first camera
10B: second camera
12A: imaging lens of first camera
12B: imaging lens of second camera
14A: camera body of first camera
14B: camera body of second camera
100: inspection device
102: image correction processing unit
102A: first image correction processing unit
102B: second image correction processing unit
104: inspection processing unit
104A: first inspection processing unit
104B: second inspection processing unit
106: parameter setting unit
110: inspection device
112: preprocessing unit
112A: first preprocessing unit
112B: second preprocessing unit
B: substrate
Fd: conveyance direction of substrate
Lb: label
i0a, i0b, i1a, i1b, i2a, i2b: image data
S1 to S7: procedure of processing of optimizing parameter of image processing

What is claimed is:

1. An image processing system comprising:
   first and second imaging units configured to respectively image first and second targets to capture image data of the first and second targets, the first and second targets being different from each other, the first imaging unit being configured not to image the second target, the second imaging unit being configured not to image the first target; and
   a processor configured to:
      acquire the image data of the first and second targets from the first and second imaging units;
      perform correction, by image processing, of the image data of the first and second targets acquired from the first and second imaging units to correct image deterioration caused by the first and second imaging units;
      inspect, measure, or recognize, by image processing, the first and second targets from the corrected image data to obtain inspection results of the first target and the second target; and
      set a parameter of the image processing in the correction according to the obtained inspection results,
   wherein the processor is configured to, in the correction, correct the image data such that in a case where the first and second targets have substantially same shapes and/or substantially same appearances, the inspection result of the first target obtained through the first imaging unit and the inspection result of the second target obtained through the second imaging unit are matched to each other at a level of accuracy with each other within a desired range.

2. The image processing system according to claim 1, wherein the processor is further configured to, in the correction, uniformize the image data by image processing to correct variations in image quality occurring due to difference in imaging environments of the first and second imaging units.

3. The image processing system according to claim 2, wherein the image deterioration is caused by an optical system provided in each of the first and second imaging units.

4. The image processing system according to claim 1, wherein the image deterioration is caused by an optical system provided in each of the first and second imaging units.

5. The image processing system according to claim 1, wherein the processor is configured to optimize the parameter based on a change in the obtained inspection results in a case where the parameter is changed.

6. The image processing system according to claim 1, wherein the processor is configured to optimize the parameter by a gradient method.

7. The image processing system according to claim 1, wherein the first and second imaging units capture the image data in a same wavelength range.

8. The image processing system according to claim 1, wherein the first and second imaging units have a same type of imaging lens and camera body.

9. An image processing device comprising:
a processor configured to:
acquire image data of first and second targets from first and second imaging units configured to respectively image the first and second targets to capture the image data of the first and second targets, the first and second targets being different from each other, the first imaging unit being configured not to image the second target, the second imaging unit being configured not to image the first target;
perform correction, by image processing, of the image data of the first and second targets acquired from the first and second imaging units to correct image deterioration caused by the first and second imaging units;
inspect, measure, or recognize, by image processing, the first and second targets from the corrected image data to obtain inspection results of the first target and the second target; and,
set a parameter of the image processing in the correction according to the obtained inspection results,
wherein the processor is configured to, in the correction, correct the image data such that in a case where the first and second targets have substantially same shapes and/or substantially same appearances, the inspection result of the first target obtained through the first imaging unit and the inspection result of the second target obtained through the second imaging unit are matched to each other at a level of accuracy with each other within a desired range.

10. The image processing device according to claim 9, wherein the processor is further configured to, in the correction, uniformize the image data by image processing to correct variations in image quality occurring due to difference in imaging environments of the first and second imaging units.

11. The image processing device according to claim 9, wherein the image deterioration is caused by an optical system provided in each of the first and second imaging units.

12. An image processing method comprising:
acquiring image data of first and second targets from first and second imaging units configured to respectively image the first and second targets to capture the image data of the first and second targets, the first and second targets being different from each other, the first imaging unit being configured not to image the second target, the second imaging unit being configured not to image the first target;
correcting, by image processing, the image data of the first and second targets acquired from the first and second imaging units to correct image deterioration caused by the first and second imaging units;
inspecting, measuring, or recognizing, by image processing, the first and second targets from the corrected image data to obtain inspection results of the first target and the second target; and
setting a parameter of the image processing in the correcting according to the obtained inspection results,
wherein in the correcting, correcting the image data such that in a case where the first and second targets have substantially same shapes and/or substantially same appearances, the inspection result of the first target obtained through the first imaging unit and the inspection result of the second target obtained through the second imaging unit are matched to each other at a level of accuracy with each other within a desired range.

13. The image processing method according to claim 12, further comprising:
in the correcting, uniformizing the image data by image processing to correct variations in image quality occurring due to difference in imaging environments of the first and second imaging units.

14. The image processing method according to claim 12, wherein the image deterioration is caused by an optical system provided in each of the first and second imaging units.

15. A non-transitory computer readable recording medium storing an image processing program causing a computer to realize:
a function of acquiring image data of first and second targets from first and second imaging units configured to respectively image the first and second targets to capture the image data of the first and second targets, the first and second targets being different from each other, the first imaging unit being configured not to image the second target, the second imaging unit being configured not to image the first target;
a function of correcting, by image processing, the image data of the first and second targets acquired from the first and second imaging units to correct image deterioration caused by the first and second imaging units;
a function of inspecting, measuring, or recognizing, by image processing, the first and second targets from the corrected image data to obtain inspection results of the first target and the second target; and
a function of setting a parameter of the image processing in the correcting according to the obtained inspection results,
wherein in the correcting, correcting the image data such that in a case where the first and second targets have substantially same shapes and/or substantially same appearances, the inspection result of the first target obtained through the first imaging unit and the inspection result of the second target obtained through the second imaging unit are matched to each other at a level of accuracy with each other within a desired range.

16. The non-transitory computer readable recording medium storing the image processing program according to claim 15, wherein the program further causes the computer to realize:
a function of, in the correcting, uniformizing the image data by image processing to correct variations in image quality occurring due to difference in imaging environments of the first and second imaging units.

17. The non-transitory computer readable recording medium storing the image processing program according to claim 15,
wherein the image deterioration is caused by an optical system provided in each of the first and second imaging units.

* * * * *